Figure 1:
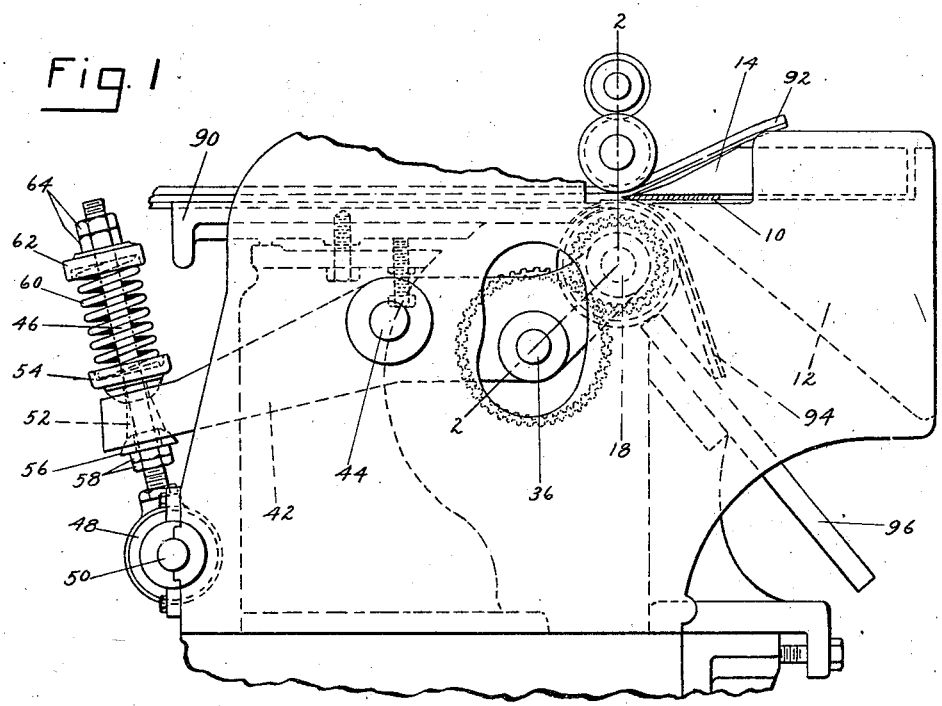

Nov. 1, 1927.  1,647,433

J. J. CALLAHAN

MACHINE FOR SPLITTING SHEET MATERIAL

Filed Aug. 31, 1925

Inventor
John J. Callahan

Patented Nov. 1, 1927.

1,647,433

UNITED STATES PATENT OFFICE.

JOHN J. CALLAHAN, OF PEABODY, MASSACHUSETTS, ASSIGNOR TO THE TURNER TANNING MACHINERY COMPANY, OF PORTLAND, MAINE, A CORPORATION OF MAINE.

MACHINE FOR SPLITTING SHEET MATERIAL.

Application filed August 31, 1925. Serial No. 53,631.

This invention relates to machines for splitting sheet material and is illustrated as embodied in a machine for splitting pieces of material having thickness dimensions which differ considerably in various parts of the same piece of material.

Splitting machines of well known commercial types commonly employed in operations upon pieces of material of considerable area, such as hides, skins and leather, ordinarily comprise a gage roll of uniform diameter adjustable with relation to a cutter so as to determine the desired thickness of the "split" to be taken from the body of the material, and a work supporting and feeding means designed to accommodate variations in the thickness dimension of pieces of work wherein the variations in thickness are not predetermined nor very considerable in extent. Such a construction as that described is not adapted to splitting operations upon pieces of material having a surface contour of predetermined unevenness such as that provided by ridges or other elevated portions, or by concaved or depressed portions, and characterized by very considerable differences in the thickness dimensions of different parts of the material.

It is an object of the invention to provide a machine adapted for splitting pieces of material each having predetermined thickness variations or thickness dimensions differing very considerably in amount in various portions of each piece, which will be simple and durable in construction and especially effective for the purposes intended.

To this end, and in accordance with important features of the invention there is provided a gage having surfaces which are adapted to be coincidental with an uneven surface of the work when the latter is in engagement with the gage. Conveniently, the gage comprises a plurality of members having different surface contours adapted to contact with and position the work as the latter is moved relatively to the cutter. As exemplified, the gage members are rollers of unequal diameter adapted to rotate at the same peripheral speed while the work is being fed past the gage.

For purposes of illustration the invention is shown embodied in a machine for splitting a piece of rubber of uneven thickness into two equal parts having practically identical surface contours, these parts being utilized in the manufacture of rubber treads for automobile tires. In accordance with a further feature of the invention and to adapt it to splitting such pieces of rubber, there is provided in the illustrated machine, improved feeding means comprising a plurality of members having feeding surfaces designed to conform to the contour of the uneven surface of the work to be fed and driven at the same peripheral speed whereby all portions of the work move at a uniform rate to the cutting means. Conveniently the feeding members are rotary cylinders some of which are power driven while others are mounted as idlers to engage with inclined surfaces on the work.

It is to be understood that in various respects the improved gage and feeding means are not limited to use in a machine of the type herein disclosed, or to use in splitting rubber treads but may have other similar applications and uses. For example, in case the work has one flat surface by which it may be either gaged or fed, the feeding means may co-operate with a gage roll adapted to gage from a level surface on the work, in presenting the work to a tool. Again, the gaging means may be employed in a construction comprising a feeding roll or other feeding member designed to engage with a substantially flat surface on the work to feed the same.

Other features of the invention and novel combinations of parts will be described in the detailed specification and pointed out in the appended claims.

Figure 2:
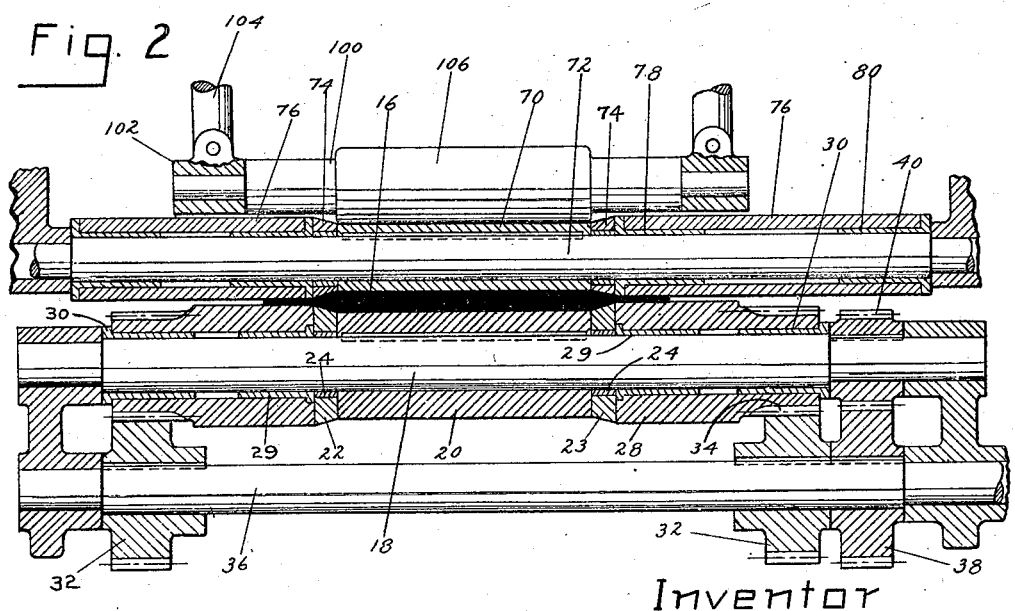

In the drawings,

Fig. 1 is a view in side elevation of a splitting machine, parts being omitted and other parts broken away the more clearly to disclose the features of the invention; and Fig. 2 is a transverse, sectional view on the line 2—2 of Fig. 1.

In the illustrated machine there is provided a cutter 10 of the band knife type which is driven continuously in one direction to draw its cutting edge through material fed to the cutter. For supporting the knife 10 there is provided a lower knife jaw 12 and in spaced relation thereto an upper knife jaw 14 which serves as a retaining plate to hold the knife in proper position upon the lower jaw. For a more complete disclosure of the band knife splitting mechanism, reference should be had to United

States Letters Patent No. 626,858, granted June 13, 1899, upon application of A. A. Chilson.

For feeding the work to the knife or cutter 10 there is provided, in the illustrated machine, a feed roll made up of a number of parts designed to engage and feed, at the same rate, all the various portions of the work which vary considerably in contour and in thickness. In the present instance the work is illustrated as a piece of rubber 16 molded in a shape and of a size to provide after splitting two rubber treads for automobile tires. For engagement with the thick portion of the work there is provided on a shaft 18 of the feeding means a feed member 20 splined on the shaft to rotate therewith. Next to the thick portion of the work is a portion which has slanting surfaces merging into a thin portion of the work. As shown, a frusto-conical feed member 22 having a slanting surface corresponding closely to the slanting surface of the work is mounted loosely on a sleeve 24 secured to the shaft 18. In other words, the feeding member 22 is not power driven but turns through its frictional contact with the work. As will be evident from inspection of Fig. 2 of the drawings there is a second idler feeding member 23 also frusto-conical in shape at the other end of the feeding member 20 which may be of the same shape as the member 22. For engagement with the thin portion of the work there is provided a feeding member 28 which is rotatable upon sleeves 29 and 30 spaced with respect to each other for the reception of lubricating substances. Preferably, and as shown, the feeding member 28 is driven at a different rate of speed than the shaft 18 and feeding member 20 by means which comprises a gear wheel 32 having teeth in mesh with a toothed portion 34 integral with or fixedly secured to the feeding member 28. Shaft 36, upon which the gear 32 is fixedly secured, is driven by power means (not shown). Fixedly secured, preferably to the same shaft 36, is a gear 38 in mesh with a gear 40 splined to shaft 18. The gears 38 and 40 have such a relation to each other and to the gears 32 and 34 that the feeding member 20, which is smaller than the feeding member 28, is driven at the same peripheral speed.

Preferably, and as shown, means is provided for pressing the feeding members yieldingly against the work, the said means comprising in the construction shown, a pair of arms, one of which is shown at 42 (Fig. 1) as pivoted at 44 in the frame of the machine and carrying at one end journals for the shafts 18 and 36. At its other end the arm 42 is provided with an opening through which passes a rod 46 secured to a collar 48 upon a pivot bar 50 mounted in the frame of the machine. An opening 52, through the end of the arm 42, is substantially larger than the rod 46 so that the latter may turn angularly therein to accommodate the rather limited movement of the arm 42. For engagement with the end of the arm 42 at each end of the opening 52 are collar members 54 and 56, the latter being backed by nuts 58 and the former serving as a seat for one end of a spring 60, the other end of which engages a collar 62 near the free end of the rod 46 and adjustably secured in place by nuts 64, so that the tension of the spring may be varied as desired.

Means is provided for gaging the work with respect to the cutting edge of the cutter 10, the said means serving also in the illustrated construction as a feeding means in co-operation with the feeding members already described. As shown, the gaging means comprises a gage member 70 splined to a shaft 72 which carries all of the gaging members.

The gaging member 70 is of the same length as the feeding member 20 on the shaft 18 since it co-operates with the feeding member 20 in engaging and feeding a thick portion of the work. At each end of the gage member 70 is a gage member 74 in the form of an idler roll frusto-conical in shape and having a cylindrical surface inclined in the opposite direction from the inclined surface on the feeding idler 22 of the work feeding means so that the two inclined surfaces may properly engage the beveled portion of the work. Finally the gaging means comprises cylindrical gaging members 76 carried by spaced sleeve members 78, 80, the latter being in direct contact with the shaft 72 and spaced from each other to provide for proper lubrication of the shaft 72 and the parts which turn thereon. It is arranged so that the gage members 74 and 76 will turn on the shaft 72 since they must turn at a different rate from the gage member 70 which is splined to the shaft 72. It will be evident upon inspection of Fig. 2 of the drawings that the feeding member 20 and its cooperating gage member 70 are of a smaller diameter than the other feeding and gaging members and that they must, therefore, rotate more rapidly in order to maintain the same peripheral speed for engagement with the work to move all parts of the latter at the same rate to the cutting knife. The gage shaft 72 with its gage member 70 securely fixed thereto will be power driven by any well known arrangement or driving means (not shown), the gage member 70 to be driven at the same peripheral speed as the feeding member 20.

Means is preferably provided for backing the gage roll so as to prevent yielding thereof away from the work, the said means comprising, in the illustrated machine, a backing cylinder 100 supported rotatably at its ends in bearings 102 pivotally carried at the lower ends of rods 104 which extend through the usual head beam of the commercial type of belt knife splitting machines. The reason for pivoting the bearings 102 to the rods 104 is to permit a certain self adjustment of the backing cylinder 100 with respect to the gaging members. Preferably, and as shown, the backing cylinder 100 has an enlarged cylindrical portion 106 to engage with and support the central gaging member 70 which is of a reduced diameter when compared with the other gaging members on the shaft 72. As shown, the end portions of the cylinder 100 furnish backing support for the gaging members 76.

In the operation of splitting a piece of work such as a double tread indicated in Fig. 2 of the drawings, the work is introduced by passing it along a table 90 until its forward end comes into engagement with the feeding and gaging members, care being taken that the thickest part of the work is presented to the gage and feed members of smallest diameter. For the purpose of guiding the work properly, side gages may be provided of any well known type made adjustable toward and from each other on the table 90. As the work is engaged by the feeding and gaging means it is conducted to the cutting edge of the cutter 10 and fed continuously to the cutter with the result that one portion or layer of the work is directed upwardly as at 92 over the upper knife jaw 14 while the other part 94 is directed downwardly below the lower knife jaw 12 and to a work guiding member 96.

Having described my invention, what I claim as new and desire to secure by Letters Patent of the United States is:—

1. In a machine for splitting a piece of rubber of varying thickness dimensions into two equal portions and adapted for use in the manufacture of rubber treads of automobile tires, a cutter, a gage having a concaved portion for the accommodation of a relatively thicker portion of the piece of rubber, and feeding means for co-operation with the gage roll in feeding the work to the cutter, comprising a feeding member of reduced diameter opposed to the concaved portion of the gage member, other feeding members for engaging the thinner edge portions of the work in co-operation with the gage roll, and means for driving all of the feeding members at the same peripheral speed.

2. In a machine for splitting a piece of rubber of varying thickness dimensions into two equal portions and adapted for use in the manufacture of rubber treads of automobile tires, a belt knife cutter, means for feeding the piece of rubber to the cutter, and a gage for guiding the work to the cutter comprising a gage member of reduced diameter to accommodate a thick part of the piece of rubber, a gage member of larger diameter to gage a thinner part of the rubber, and power means for driving the reduced gage member, the other gage member being free to move at the same peripheral speed.

3. In a machine for splitting a piece of rubber of varying thickness dimensions into two equal portions and adapted for use in the manufacture of rubber treads of automobile tires, a cutter, a gage having a concaved portion for the accommodation of the relatively thicker portion of the piece of rubber, and feeding means for co-operation with the gage roll in feeding the work to the cutter comprising a shaft, a feeding member splined to the shaft and having a cylindrical surface for co-operation with the concaved surface of the gage roll, feeding members on the shaft for engaging with a thinner portion of the rubber piece on each side of the thicker portion thereof, idler members for engaging slanting surfaces of the work located between the thicker and the thinner portions thereof, and means for driving the feeding members at the same peripheral speed.

4. In a machine of the character described, a tool, and a member for gaging work, prior to the operation of the tool, having gaging surfaces in a plurality of planes so arranged that said gaging surfaces are substantially coincidental with the gaged surfaces of the work when the latter is in contact with the gage.

5. In a machine of the character described, a tool, and means for gaging work prior to the operation of the tool comprising a plurality of members having different surface contours adapted to contact with the work while the latter is being fed past the gaging means.

6. In a machine of the character described, a tool, and means for gaging work prior to the operation of the tool comprising a plurality of rotary members having different surface contours to engage the work and moving at different rates of axial speed.

7. In a machine of the character described, a tool, and means for gaging work prior to the operation of the tool comprising a plurality of rollers of unequal diameter adapted to rotate at the same peripheral speed while the work is being fed past the gage to the tool.

8. In a machine of the character described, a cutter, and gaging means comprising a shaft, a sleeve splined to the shaft and having a cylindrical surface for gaging contact with the work, means for driving the shaft, and other work-gaging members on the shaft mounted to turn freely thereon, said sleeve and the other work gaging members having an unyielding backing to insure their action as gaging means.

9. In a machine of the character described, a cutter, a gage, and means for feeding the work to the cutter, comprising feed members of different diameters disposed in end-to-end relationship and providing, in conjunction, a work-engaging surface of a contour shaped to conform substantially to that of the engaged surface of the work.

10. In a machine of the character described, a cutter, a gage for determining the thickness of the material to be removed by the cutter, and means for feeding the material to the cutter comprising a plurality of members having different surface contours corresponding to variously shaped surfaces on the work and moving at the same peripheral speed, whereby all portions of the work are fed at the same rate to the cutter.

11. In a machine of the character described, a cutter, a gage for determining the thickness of a "split" to be removed from the body of a piece of material, means for feeding the material to the cutter comprising a plurality of rotary members, and power means for driving certain of the members, others of the members having surfaces inclined to the axis of their rotation and mounted idly for movement by the material.

12. In a machine of the character described, a cutter, gaging means for determining the thickness of the split to be removed from the material, and a plurality of feeding members for advancing the work to the cutter, said gaging means and feeding members having reversely located surfaces each shaped to conform to corresponding surfaces on the engaged portions of the work, certain of the feeding members being driven at different rates of angular speed to secure uniform feeding of the work.

13. In a machine of the character described, a tool, gaging means, and means for feeding the work to the tool, one of said means comprising portions driven at different rates of speed in accordance with differences in the thickness of the work between the feeding and the gaging means.

14. In a machine of the character described, a tool, gaging means, and means for feeding the work to the tool, one of said means comprising a plurality of members of various diameters disposed in end-to-end relationship, and means for driving one of the members at greater speed than that of another member.

15. In a machine of the character described, a tool, gaging means, and means for feeding the work to the tool, one of said means comprising a plurality of members having cylindrical surfaces for engaging with the work and other members having frusto-conical surfaces for engaging with the work, said last-mentioned members being free to turn relatively to the other members.

16. In a machine of the character described, a cutter, gaging means, and means for feeding the work to the cutter, one of said means comprising a shaft, a member splined to the shaft and having a cylindrical surface for contact with the work, means for driving the shaft, a second member on the shaft having a surface for contact with the work, means for driving the second member at a different rate of speed from that of the first member, and other work-engaging members on the shaft mounted to turn freely thereon.

17. In a machine of the character described, a tool, gaging means, and means for feeding work to the tool, one of said means comprising a plurality of work-engaging members of different diameters and having the same peripheral speed.

18. In a machine of the character described, a cutter, a gage, and feeding means for co-operation with the gage for feeding the work to the cutter, said gage and feeding means having each work-engaging members of different diameters and having substantially the same peripheral speed.

19. In a machine of the character described, a cutter, a gage, and feeding means for co-operation with the gage for feeding the work to the cutter, said gage and feeding means being provided with members of reduced diameters with respect to other members of the gage and feeding means, respectively, for accommodation between them of the thicker portions of the work, and means for driving the members of reduced diameters at the same peripheral speed as the other members.

20. In a machine of the character described, a cutter, a gage, feeding means for co-operation with the gage in feeding work interposed between the feeding means and the gage to the cutter, lever arms for supporting the feeding means, compressible springs co-operating with the lever arms for yieldingly holding the feeding means against the work, and means for holding the gage unyieldingly in position with respect to the cutter.

21. In a machine of the character described, a cutter, a gage, feeding means for co-operation with the gage in feeding the work to the cutter, a pair of arms for supporting the feeding means, a shaft mounted in the arms, a plurality of gears mounted on the shaft, said feeding means comprising a plurality of feeding members of different diameters, and gears connected with the feeding members and co-operating with the gears on the shaft for driving the feeding members at the same peripheral speed.

In testimony whereof I have signed my name to this specification.

JOHN J. CALLAHAN.